United States Patent
Oikawa

(10) Patent No.: US 8,104,013 B2
(45) Date of Patent: Jan. 24, 2012

(54) DESIGN METHOD OF SEMICONDUCTOR PACKAGE SUBSTRATE TO CANCEL A REFLECTED WAVE

(75) Inventor: Ryuichi Oikawa, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 237 days.

(21) Appl. No.: 12/453,494

(22) Filed: May 13, 2009

(65) Prior Publication Data

US 2009/0283892 A1 Nov. 19, 2009

(30) Foreign Application Priority Data

May 13, 2008 (JP) ................................. 2008-125517

(51) Int. Cl.
*G06F 17/50* (2006.01)
(52) U.S. Cl. ............................ 716/132; 716/110; 333/32
(58) Field of Classification Search .................. 716/110, 716/132; 333/32
See application file for complete search history.

(56) References Cited

U.S. PATENT DOCUMENTS

| | | | |
|---|---|---|---|
| 6,223,334 B1* | 4/2001 | Suaris et al. .................. | 716/122 |
| 6,529,091 B2* | 3/2003 | Miura et al. ................. | 333/81 A |
| 6,892,171 B2* | 5/2005 | Baco ............................... | 703/13 |
| 6,937,059 B2* | 8/2005 | Satou et al. ...................... | 326/30 |
| 7,292,054 B2* | 11/2007 | Oikawa .......................... | 324/718 |
| 7,342,470 B2* | 3/2008 | Bassali .......................... | 333/219 |
| 7,795,588 B2* | 9/2010 | Kasai et al. ................. | 250/341.1 |
| 2002/0133790 A1* | 9/2002 | Harada ............................. | 716/4 |
| 2005/0146390 A1 | 7/2005 | Baek | |
| 2007/0069820 A1* | 3/2007 | Hayata et al. .................. | 330/298 |
| 2009/0167457 A1* | 7/2009 | Melde et al. ..................... | 333/32 |

FOREIGN PATENT DOCUMENTS

| | | |
|---|---|---|
| JP | 2000-151115 | 5/2000 |
| JP | 2004-146810 | 5/2004 |
| JP | 2005-197720 | 7/2005 |
| JP | 2005-236064 | 9/2005 |

* cited by examiner

*Primary Examiner* — Naum Levin
(74) *Attorney, Agent, or Firm* — McGinn IP Law Group, PLLC

(57) ABSTRACT

When the impedance of a first circuit is deviated from a standard value, a second circuit is designed for generating a second reflected wave to cancel a first reflected wave generated by the first circuit. Individual structural parts in a transmission line are intentionally designed to be deviated from a standard impedance reversely under a fine control. By this method, the impedance matching between the input and output impedance of the semiconductor element and the transmission line is achieved. As a result, the terminal impedance of the component of the semiconductor circuit and the semiconductor package substrate is adjusted to 50 Ohm, so that a good signal property can be obtained.

16 Claims, 17 Drawing Sheets

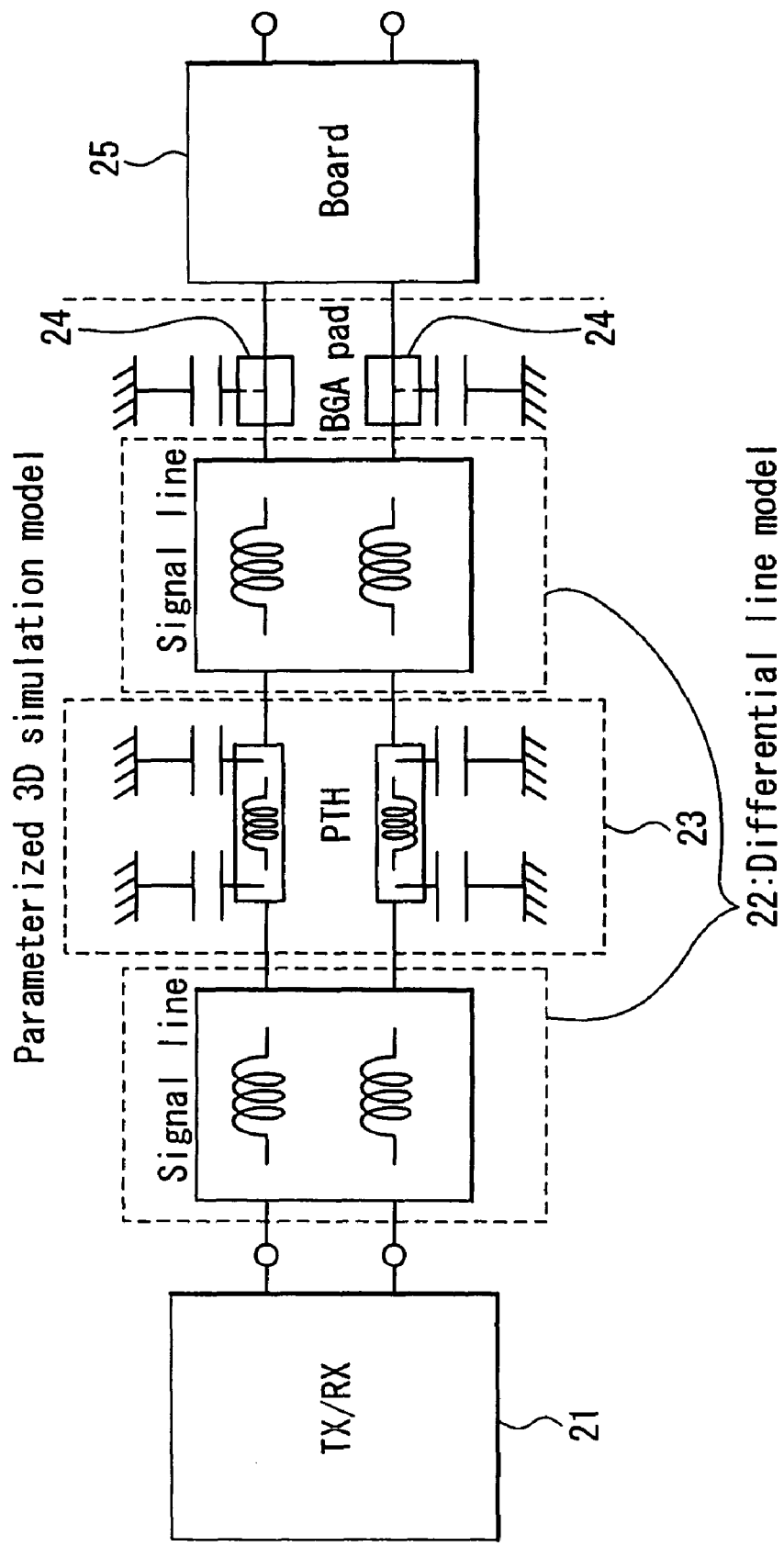

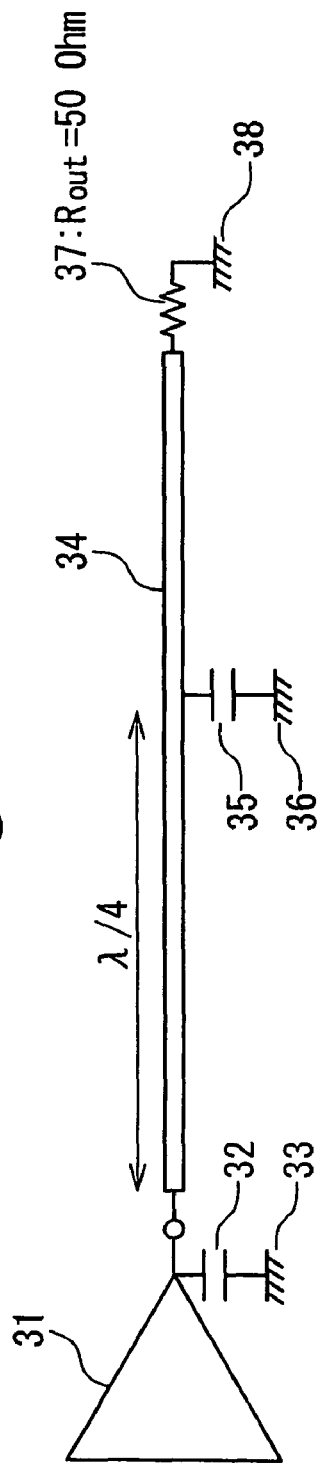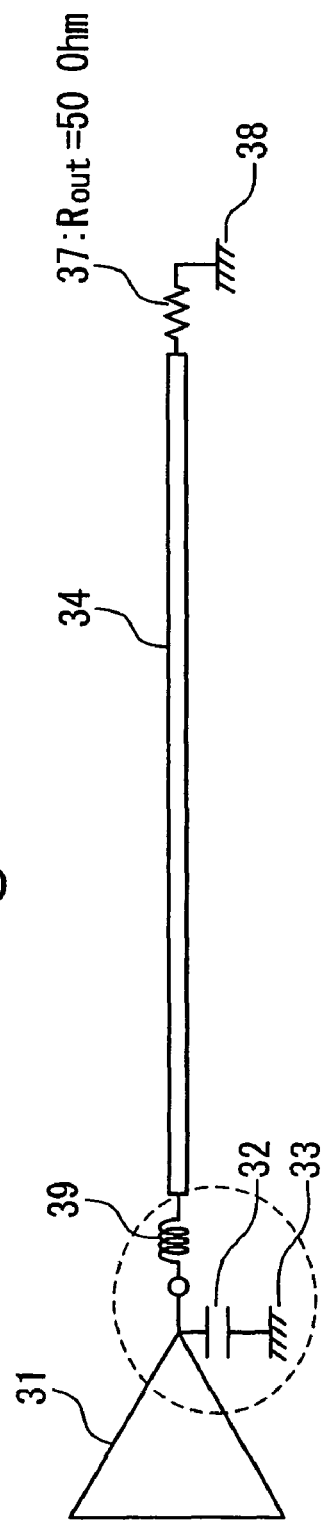

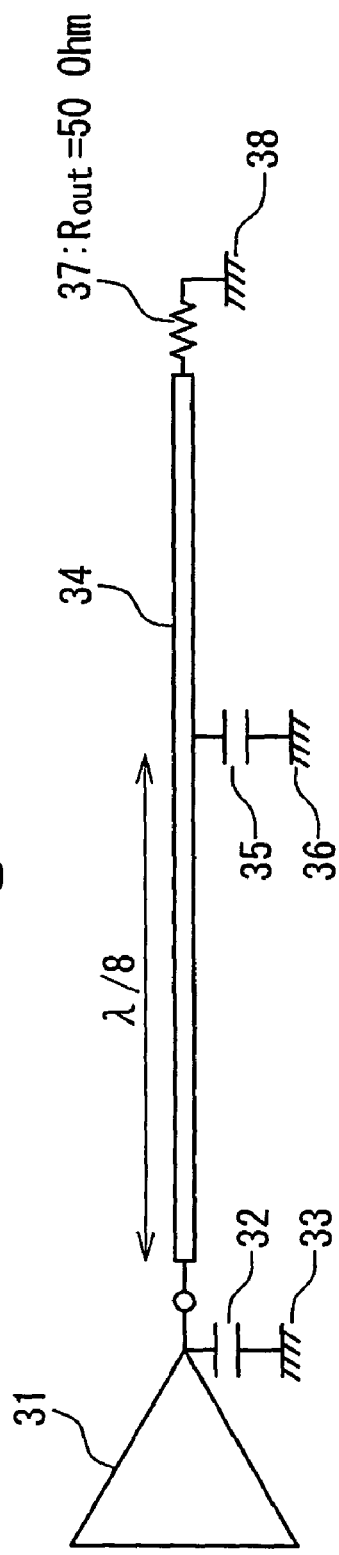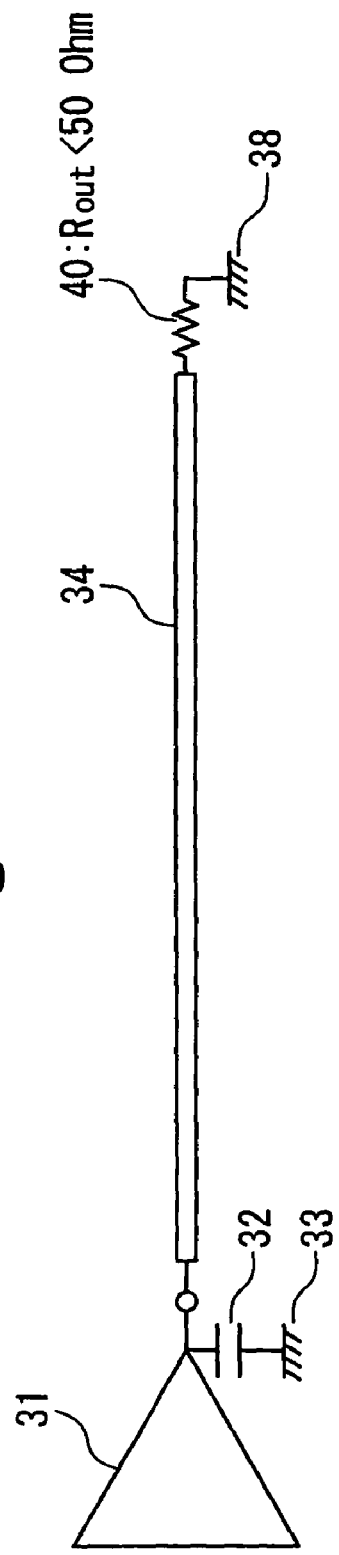
Fig. 12A
Fig. 12B

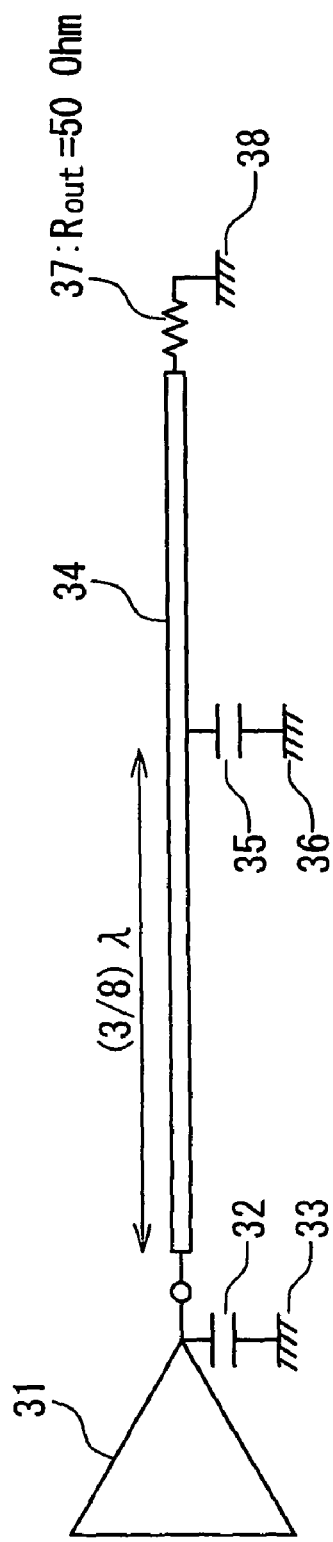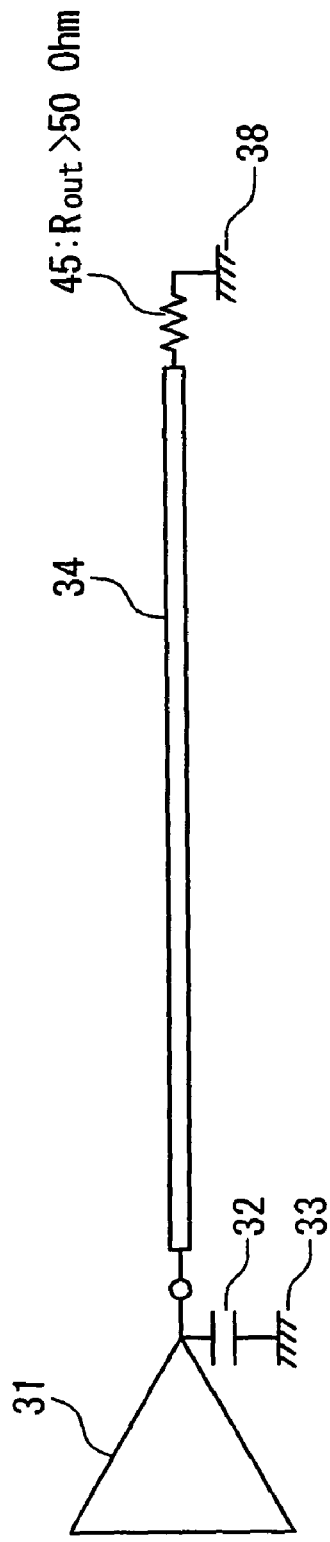

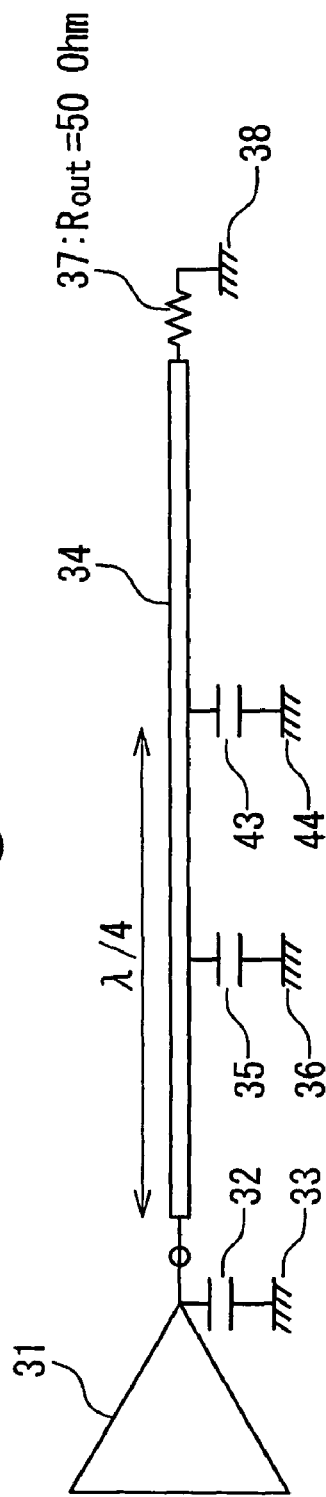
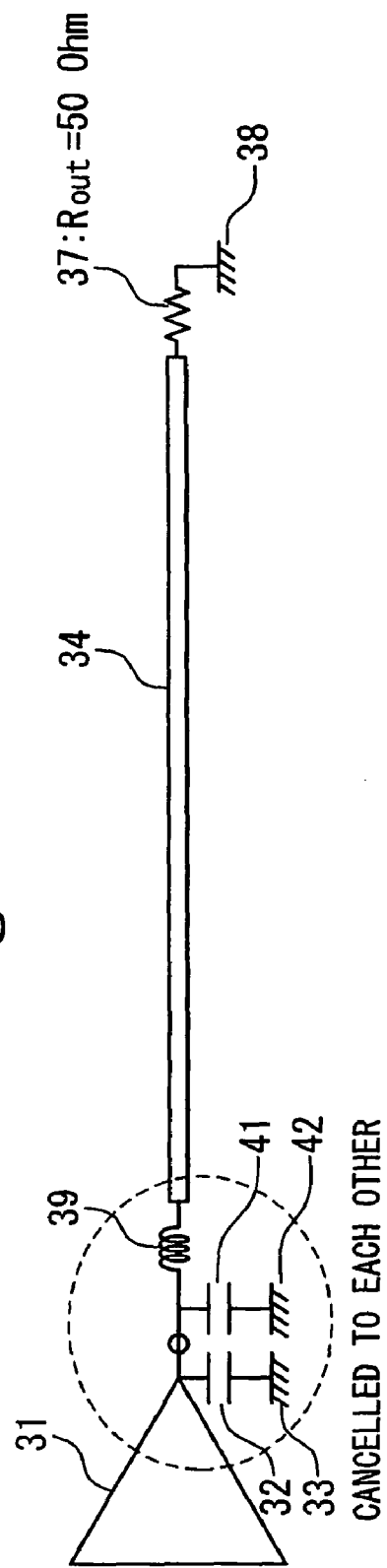

| Tag | S-parameter |
|---|---|
| Substrate Technology D$_{PTH}$ D$_{Land}$ CL$_1$ CL$_2$ D$_{Pair}$ | (S$ij$($\omega$)) |
| Substrate Technology D$_{PTH}$ D$_{Land}$ CL$_1$ CL$_2$ D$_{Pair}$ | (S$ji$($\omega$)) |
| Substrate Technology D$_{PTH}$ D$_{Land}$ CL$_1$ CL$_2$ D$_{Pair}$ | (S$ji$($\omega$)) |
| . . . . . . | . . . . . . |
| Substrate Technology D$_{PTH}$ D$_{Land}$ CL$_1$ CL$_2$ D$_{Pair}$ | (S$ji$($\omega$)) |

DESIGN METHOD OF SEMICONDUCTOR PACKAGE SUBSTRATE TO CANCEL A REFLECTED WAVE

INCORPORATION BY REFERENCE

This patent application is based on Japanese Patent Application No. 2008-125517. The disclosure of the Japanese Patent Application is incorporated herein by reference.

BACKGROUND OF THE INVENTION

1. Field of the Invention

The present invention relates to a semiconductor package substrate, a design method thereof, a manufacturing method thereof and design support apparatus thereof. More particularly, the present invention relates to a semiconductor package substrate on which a semiconductor chip is primarily mounted and which is secondly mounted on a secondary mounting substrate, and a designing method thereof, a manufacturing method thereof, and a design support apparatus for supporting the design thereof.

2. Description of Related Art

In a connection portion of a semiconductor chip and a semiconductor package substrate primarily mounting the semiconductor chip, the impedance matching between the input and output of both units is important. In an input/output pad of the semiconductor chip, 50Ω is considered to be a standard value of the input/output impedance when it is observed from the outside. Thus, an input/output impedance of the semiconductor package substrate when it is observed from the semiconductor chip is ideally designed to be equal to the standard value.

For such a design, for example, a technique for achieving the impedance matching is known in which a layout pattern formed in a printed circuit board is used. Specifically, capacitor elements can be formed by a copper foil layer which is formed other than the signal layer. By adopting this technique, the impedance matching is achieved without additional electronic parts.

In relation to the above technique, the patent document 1 (Japanese Laid-Open Patent Application JP-P2000-151115A) discloses an invention related to a printed circuit board.

The printed circuit board of the invention in the patent document 1 contains a plurality of conductive layers, interconnections and capacitor elements. Here, the plurality of conductive layers are sequentially laminated via insulating layers between them. The interconnection is formed by the conductive layer for connecting the circuit parts to be mounted to each other. The capacitor element is formed by an insulating layer and a conductive layer opposing via this insulating layer and connected to interconnections for achieving the impedance matching of circuit parts.

Also, in the patent document 2 (Japanese Laid-Open Patent Application JP-P2004-146810A), an invention regarding a printed circuit board is described. The printed circuit board of this invention contains a multilayer substrate, via holes, surface layer interconnections, at least one inner layer interconnection and conductive members. Here, the via hole is formed to pierce the multilayer substrate. The surface layer interconnection is formed on the surface layer of the multilayer substrate and connected to a first end which is an end of the via hole. At least one inner layer interconnection is formed inside the multilayer substrate and connected to a conductive portion of the via hole at a position other than the top and bottom end thereof. The conductive member is connected to a second end, being positioned on the side opposite to the first end of the conductive portion of the via hole, to which the surface layer interconnection is not connected.

The conductive member has an electrical length so that the value of the impedance at a predetermined frequency is higher than a predetermined value, when the conductive member is observed from a first connecting point which is one of the connecting points between the inner layer and the conductive portion of the via hole and closest to the second end. The predetermined value is the impedance value of the second end portion at a predetermined frequency, when it is observed from the first connecting point in a case where the conductive member does not exist.

Also, the patent document 3 (Japanese Laid-open Patent Application JP-P2005-197720A) discloses an invention regarding a multilayer substrate.

The multilayer substrate of the invention in the patent document 3 contains: a plurality of metal layers on which predetermined printed circuit patterns are respectively formed; and insulating layers respectively formed between the metal layers. Here, the plurality of metal layers contain at least two high frequency signal layers and at least one ground layer. The at least two high frequency signal layers are provided for transmitting high frequency signals. The at least one ground layer is provided for supplying the ground to the other metal layers. This multilayer substrate contains at least one via hole and an impedance matching hole. The at least one via hole is formed to pierce the multilayer substrate for connecting the high frequency signal layers to each other. The impedance matching hole is formed to pierce the ground layer for providing a path through which the via hole is arranged.

This multilayer substrate is characterized in that the separation distance between the via hole and the ground layer is suitably adjusted by the impedance matching hole to adjust the capacitance, and together with the inductance specific to the via hole, the state similar to the waveguide path is exhibited, thereby attaining the impedance matching of the multilayer substrate when high frequency signals are transmitted between the high frequency signal layers.

The patent document 4 (Japanese Laid-Open Patent Application JP-P2005-236064A) discloses an invention regarding a signal transmission pair interconnection.

The signal transmission pair interconnection of the invention in the patent document 4 is formed by laminating a plurality of patterned metal layers and a dielectric layer and connecting the layers by via holes. This signal transmission pair interconnection is characterized in that the diameter and the interval of the vias through which the plurality of interconnections formed by the patterned metal layers are connected to each other are adjusted so that the characteristic impedance becomes a constant value.

SUMMARY

However, when this technique is applied to high speed signal devices exemplified by the SerDes (SERializer/DESerializer, serial/parallel mutual conversion circuit), there are essentially two problems. The first problem lies in the fact that the element which can be added onto a printed circuit board is limited to capacitor elements. The input/output impedance of semiconductor input/output elements is typically capacitive. Therefore, even if a capacitor element is further added onto the side of the printed circuit board, the impedance from a signal transfer path is further deviated. As a result, contrary to an intension of the technique, the performance is deteriorated.

The second problem lies in an adverse effect that is brought about because the unnecessary element structure exists in transmission lines. The capacitor elements in the above-mentioned technique are generated by adding branches such as openings or short-circuits in middle positions of the original necessary transmission lines. However, it is known that those branches operate as stubs so that the signal transmission property is deteriorated.

In a reference technique of the present invention, each of individual structural parts in a signal transmission line is adjusted to the standard impedance of 50Ω. By such a design, the entire impedance of the signal transmission line is adjusted to become close to 50Ω in the reference technique. In an aspect of the present invention, the standard impedance of 50Ω is not significant. This is because the signal transmission line in the present invention is designed such that, even if the impedance is deviated from the standard value, the reflected signal wave caused by the deviation is cancelled by another reflected signal wave. In order to achieve such a design, in an aspect of the present invention, individual structural parts in a signal transmission line are intentionally designed to be deviated from a standard impedance reversely as necessary, under a careful control. With such design, the impedance of the signal transmission line is matched with the input/output impedance of the connected semiconductor element. As a result, as the component composed of the semiconductor element and the semiconductor package substrate on which the semiconductor is primarily mounted, a terminal impedance is adjusted to 50Ω. Thus, an excellent signal performance is obtained.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 10 is a block diagram of a semiconductor package substrate on which a semiconductor input/output element is primarily mounted and which is secondarily mounted on a secondary mounting substrate;

FIG. 11A is a circuit diagram in which a capacitor is added at a position of a 1/4 wavelength from a semiconductor input/output element on a distributed signal line;

FIG. 11B is an equivalent circuit of the circuit shown in FIG. 11A;

FIG. 12A is a circuit diagram in which a capacitor is added at a position of a 1/8 wavelength from a semiconductor input/output element on a distributed signal line;

FIG. 12B is an equivalent circuit of the circuit shown in FIG. 12A;

FIG. 13A is a circuit diagram in which a capacitor is added at a position of a 3/8 wavelength from a semiconductor input/output element on a distributed signal line;

FIG. 13B is an equivalent circuit of the circuit shown in FIG. 13A;

FIG. 15A is a circuit diagram in which a capacitor is added at a position of a 1/4 wavelength from a semiconductor input/output element on a distributed signal line, and a capacitor is similarly added at a position of a 1/2 wavelength, respectively;

FIG. 15B is an equivalent circuit of the circuit shown in FIG. 15A;

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

A design method of a semiconductor package substrate, a semiconductor package substrate design support apparatus and a semiconductor package substrate according to embodiments of the present invention will be described below with reference to the attached drawings.

The semiconductor package substrate according to embodiments of a present invention can be designed by a semiconductor package substrate design support apparatus according to embodiments of the present invention, by using the semiconductor package substrate design method according to embodiments of the present invention.

Figure 1:
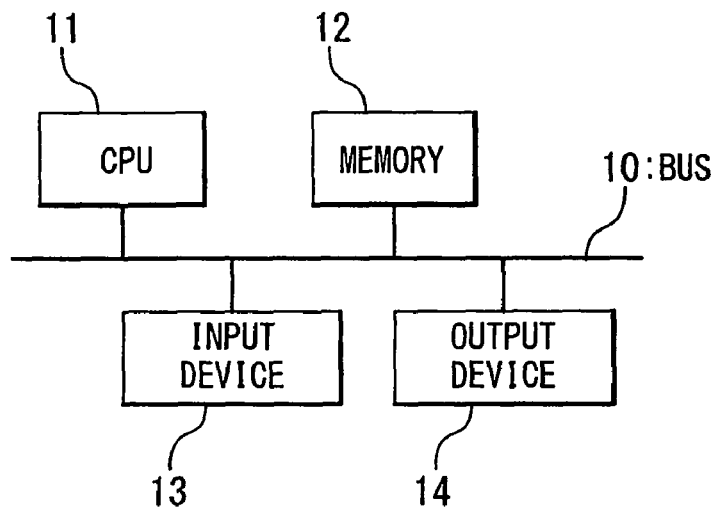
FIG. 1 is a conceptual view of one example of the semiconductor package substrate design support apparatus according to an embodiment of the present invention.

FIG. 1 is a conceptual view of a semiconductor package substrate design support apparatus according to an embodiment of the present invention. The semiconductor package substrate design support apparatus in this embodiment may be a computer which includes, for example, a CPU 11, a memory 12, an input apparatus 13 and an output apparatus 14. Here, the CPU 11, the memory 12, the input apparatus 13 and the output apparatus 14 are connected to each other through a bus 10.

Figures 22, 23:
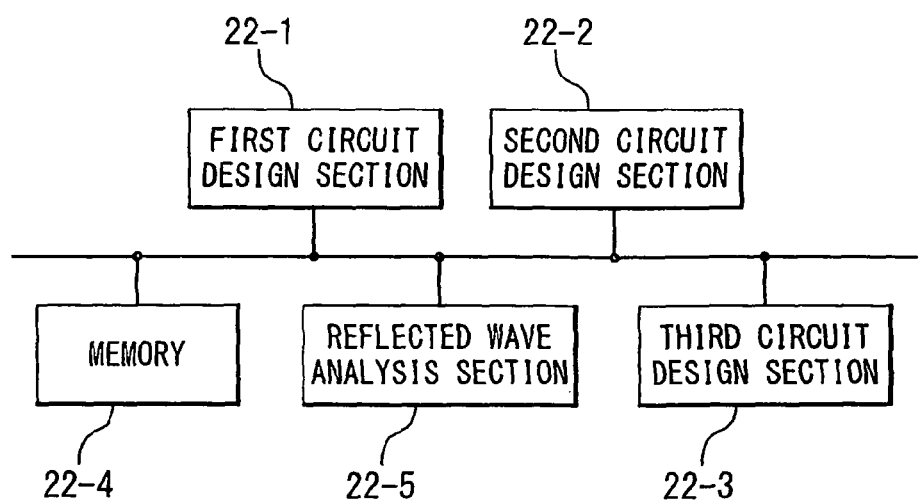
FIG. 22 shows an example of the data form of a lookup table.
FIG. 23 shows a block diagram of a semiconductor package substrate design method according to an embodiment of the present invention.

FIG. 23 shows a function block diagram of a semiconductor package substrate design support apparatus according to an embodiment of the present invention. The semiconductor package substrate design support apparatus includes a first circuit design section 22-1, the second circuit design section 22-2, the third circuit design section 22-3, the memory 22-4 and the reflected wave analysis section 22-5. The design support apparatus mentioned above can be implemented as a computer system having the structure shown in FIG. 1, especially by computer readable software product stored in the memory 12, read and performed by the CPU 11. The first circuit design section 22-1, the reflected wave analysis section 22-5, the second circuit design section 22-2 and the third circuit design section 22-3 can share the CPU 11, the memory 12, the input device 13 and the output device 14 physically or by time-sharing. The memory 22-4 can be realized by the physical memory 12. The reflected wave analysis section 22-5 can consist of a circuit simulator.

Figure 24:
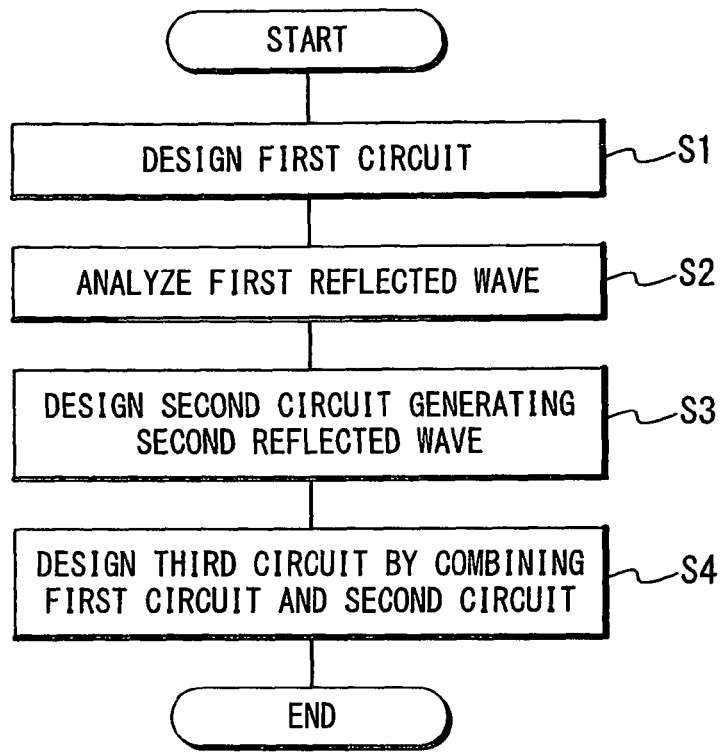
FIG. 24 shows a flowchart of a semiconductor package substrate design method according to an embodiment of the present invention.
Figure 25:
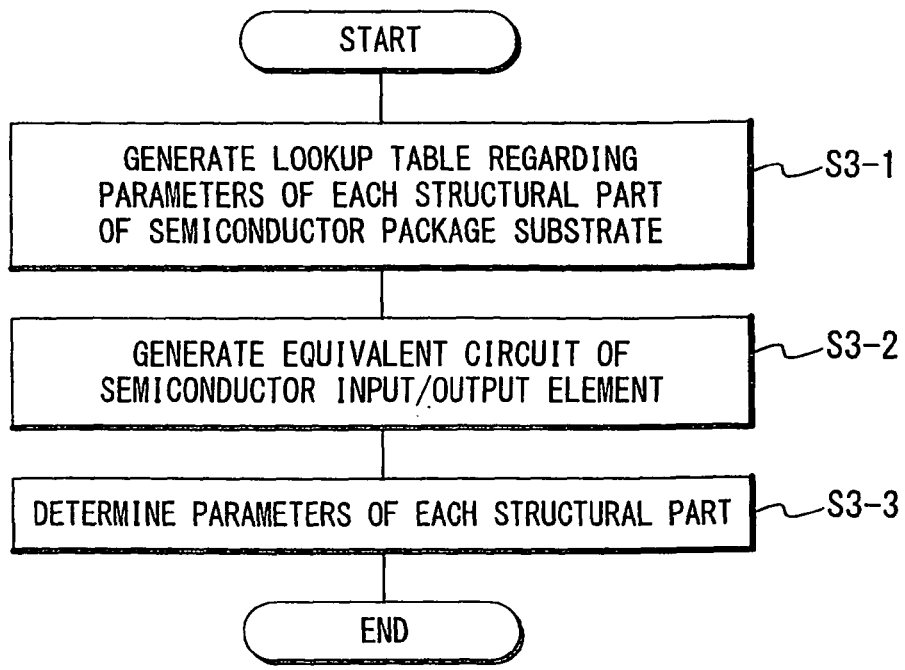
FIG. 25 shows a flowchart of a semiconductor package substrate design method according to an embodiment of the present invention.

FIG. 24 shows a flowchart indicating respective steps of a semiconductor package substrate design method according to an embodiment of the present invention. FIG. 25 shows detailed steps in the step S3 shown in FIG. 24.

In a semiconductor package substrate according to an embodiment of the present invention, the impedance matching at an interface is achieved by canceling a reflected wave occurred in a circuit by another reflected wave generated in the same circuit.

A semiconductor package substrate designing method according to an embodiment of the present invention includes four steps shown in FIG. 24. At first, at the step S1, the first circuit design section 22-1 designs a first circuit without considering the cancelling of the reflected wave and the impedance matching. Next, at the step 32, the reflected wave analysis section 22-5 analyzes the first reflected wave generated in the first circuit. At the step S3, a second circuit design section 22-2 designs a second circuit for generating a second reflected wave which is designed to cancel the first reflected wave. Finally, at the step S4, the third circuit design section 22-3 design a third circuit which cancels the two reflected waves by combining the first and second circuits. At this time, ideally, the two reflected waves are completely canceled and do not escape from the third circuit to the outside. As a result, the impedance matching is achieved. Namely, the impedance of the third circuit is more closely adjusted to the input/output impedance of the semiconductor element than the first circuit.

A semiconductor package manufacturing method according to an embodiment of the present invention is designed such that a fifth step of manufacturing the semiconductor package substrate is added after the four steps in the semiconductor package substrate designing method explained above. At this fifth step, of course, the semiconductor package substrate is manufactured in accordance with the various parameters determined at the step S4.

Figure 21A:
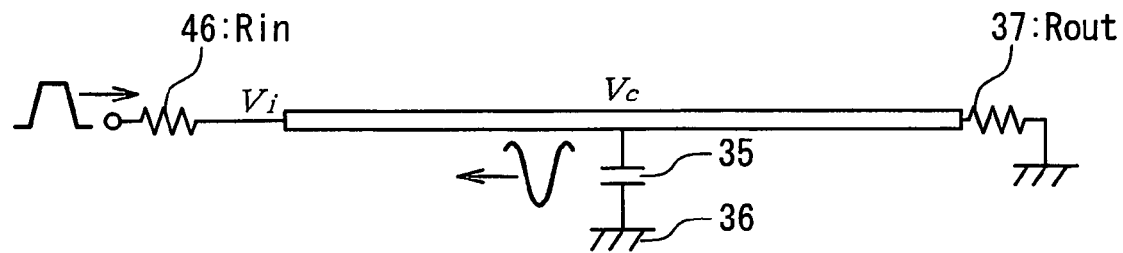
FIG. 21A shows an equivalent circuit of the second circuit of three circuits designed by an embodiment of the present invention.
Figure 21B:
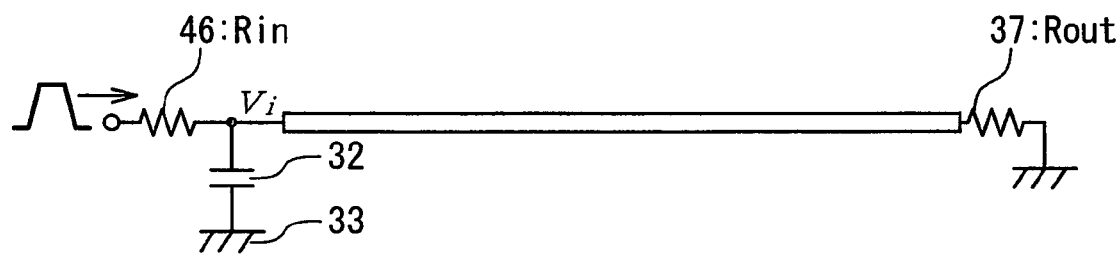
FIG. 21B shows an equivalent circuit of the first circuit.
Figure 21C:
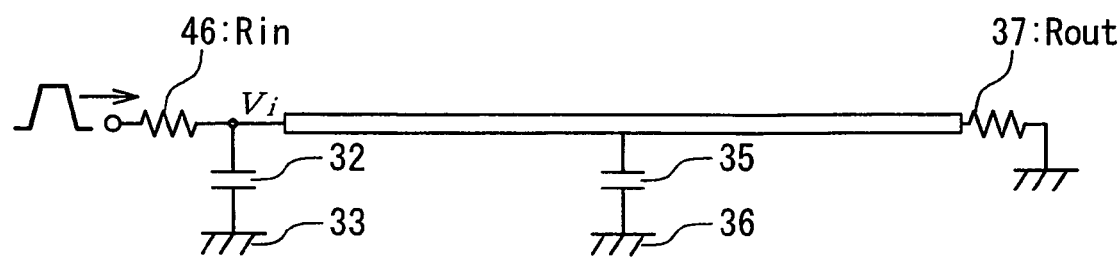
FIG. 21C shows an equivalent circuit of the third circuit.

FIGS. 21A to 21C are circuit diagrams for explaining equivalent circuits of three circuits designed by an embodiment of the present invention. FIG. 21B is an equivalent circuit diagram of the first circuit of the three circuits. A voltage Vsource is inputted through a resistor 46 to one of both ends of a transmission line, and the other end is terminated by a resistor 37. One end of the capacitor 32 is connected to the node between the resistor 46 and an end of the transmission line. The other end of the capacitor 32 is grounded.

Figure 20A:
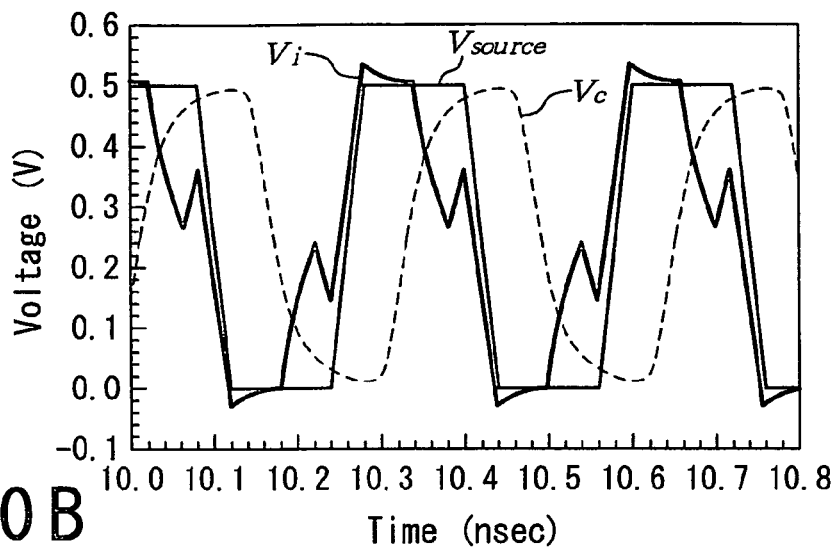
FIG. 20A is a simulation result of a waveform of the second circuit of three circuits designed by an embodiment of the present invention.
Figure 20B:
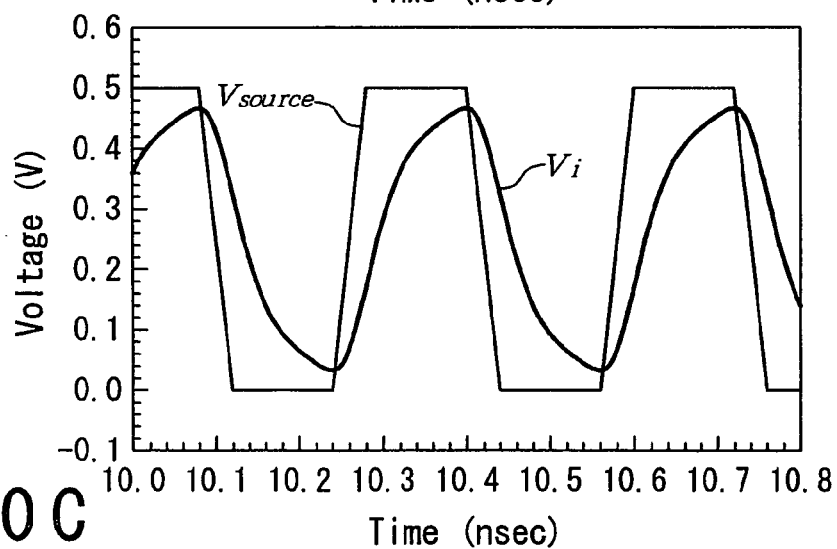
FIG. 20B is a simulation result of a waveform of the first circuit.
Figure 20C:
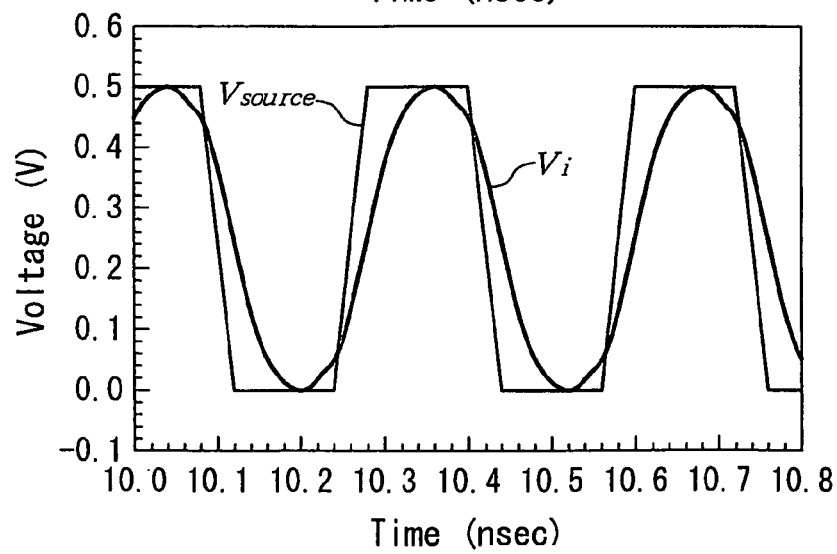
FIG. 20C is a simulation result of a waveform of the third circuit.

FIGS. 20A to 20C show simulated waveforms for the three circuits designed in this embodiment. In each waveform, the voltages Vsource and Vi correspond to the voltage inputted to the input end of the resistor Rin46 and the voltage at the capacitor 32, respectively.

In FIG. 20B, the difference between the waveform of Vsource and the waveform of Vi is caused by the reflected wave. That is, it indicates that the impedance is not matched.

FIG. 21A is an equivalent circuit diagram of the second circuit. The voltage Vsource is inputted through the resistor 46 to one of both ends of the transmission line, and the other end is terminated by a resistor 37. Additionally, a capacitor 35 is connected to a middle node of the transmission line and ground. Although the capacitor 35 connected at a determined distance from one end of the transmission line is a lumped circuit element, it may actually be a distributed capacitance belonging to the signal transmission line. In this circuit diagram, the buffer connected to the input end of the transmission line is assumed to be ideal, which means there is no parasitic capacitance 32.

FIG. 20A is a simulated waveform of the second circuit. The voltages Vsource, Vi and Vc correspond to the voltage inputted to the input end of the resistor Rin46, the voltage at the capacitor 32, and the voltage at the capacitor 35, respectively.

When the voltage Vsource is inputted to the second circuit, a second reflected wave is generated by the capacitor 35. The Vc corresponds to the voltage of the capacitor 35. The second reflected wave flows through the transmission circuit in the opposite direction and has influence on the Vi.

As an example, the second reflected wave that cancels the first reflected wave caused by the influence of a parasitic capacitance is obtained by placing a capacitor at the distance of $\lambda/8$ to $\lambda/4$ from the parasitic capacitance in an equivalent circuit of the transmission line. Also, the second reflected wave that cancels the first reflected wave caused by the influence of a parasitic inductance is obtained by placing a capacitor at the distance of $3\lambda/8$ to $\lambda/2$ from the parasitic inductance in an equivalent circuit of the transmission line.

FIG. 21C is an example equivalent circuit diagram for the third circuit. The third circuit is a combination of the first and second circuits. That is, the voltage Vsource is inputted through the resistor 46 to one of both ends of the transmission line, and the other end is terminated by the resistor 37. An end of the capacitor 32 is connected to the connecting node between the resistor 46 and an end of the transmission line, and the other end of the capacitor 32 is grounded. Capacitor 35 is connected to a middle node of the transmission line and ground. Although the capacitor 35 connected at a determined distance from one end of the transmission line is a lumped circuit element, it may actually be a distributed capacitance belonging to the signal transmission line.

FIG. 20C is a waveform simulation result of the third circuit. A waveform Vsource corresponds to the voltage inputted to the resistor Rin46 which is equal to the waveform Vsource in FIG. 20B or FIG. 20A. The Vi corresponds to the voltage at the parasitic capacitance 32.

The waveform Vi in FIG. 20C is significantly closer to the waveform Vsource as compared with the waveform Vi in FIG. 20B. This indicates that the addition of the circuit in FIG. 20C to the circuit in FIG. 20A contributes to the impedance matching.

The operations of the first circuit design section 22-1 and the third circuit design section 22-3 are relatively simple. However, the operation of the second circuit design section 22-2 is relatively difficult. That is, although the design of the second circuit is theoretically possible by adopting the so-called electromagnetic field simulator, it takes too long time so that such a process is not realistic.

To overcome such a problem, in this embodiment of the semiconductor package substrate designing method, a lookup table is adopted. In this method, the time required to design the second circuit could be reduced to approximately 1/1000 to 1/100 as compared with the method in which a general electromagnetic field simulator was employed. The designing method of this embodiment is explained below in detail, especially on the design process of the second circuit.

In a semiconductor package substrate designing method according to this embodiment, the third step S3 of designing the second circuit is further divided into three steps S3-1 to S3-3 shown in FIG. 25. At first, at the step S3-1, the lookup table for the parameters is generated for each of the structural parts of the semiconductor package substrate. Next, at the step S3-2, an equivalent circuit for representing the input/output impedance of the semiconductor input/output element is generated. Finally, at the step S3-3, various parameters are determined to satisfy a predetermined condition.

Figure 2:
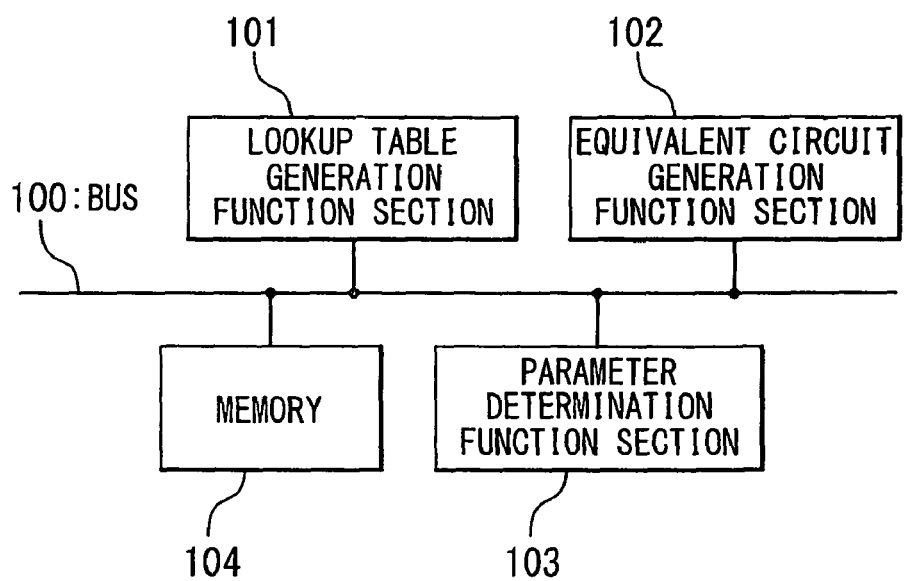
FIG. 2 is a block diagram which describes each function of a second circuit design section in a semiconductor package substrate design support apparatus.

FIG. 2 is a block diagram for describing the functions of the second circuit design section 22-2 in the semiconductor package substrate design support apparatus in detail. The second circuit design section 22-2 in this embodiment of the semiconductor package substrate design support apparatus includes; a lookup table generation function section 101 for carrying out the step 33-1; an equivalent circuit generation function section 102 for carrying out the step S3-2; and a parameter determination function section 103 for carrying out the step S3-3. Each section can be implemented as a computer program stored in the memory 12 and performed by the CPU 11.

Here, the step S3-1 is described in detail. In a semiconductor package substrate design method in an embodiment of the present invention, a simulation is carried out for determining required parameters based on the equivalent circuit of a semiconductor package substrate. The equivalent circuit of the package substrate consists of various pre-calculated model components, which model parameters are stored in the lookup table by the lookup table generation function section 101. The generated lookup table may be stored in the memory 12 or may be directly transmitted to the parameter determination function section 103 from the lookup table generation function section 101.

FIG. 22 shows an example of the data format of the lookup table. "Substrate Technology" indicates the sectional structure of the substrate and includes the number of the layers in the substrate, their thicknesses and material properties of the respective structural parts and the like. Here, the material properties of each of the structural parts include the dielectric constant of a dielectric material, the dielectric loss, the conductivity of a conductor and the like. The S-parameter of each structural part of the semiconductor package substrate is different from each other depending on its physical dimensions.

Figure 3:
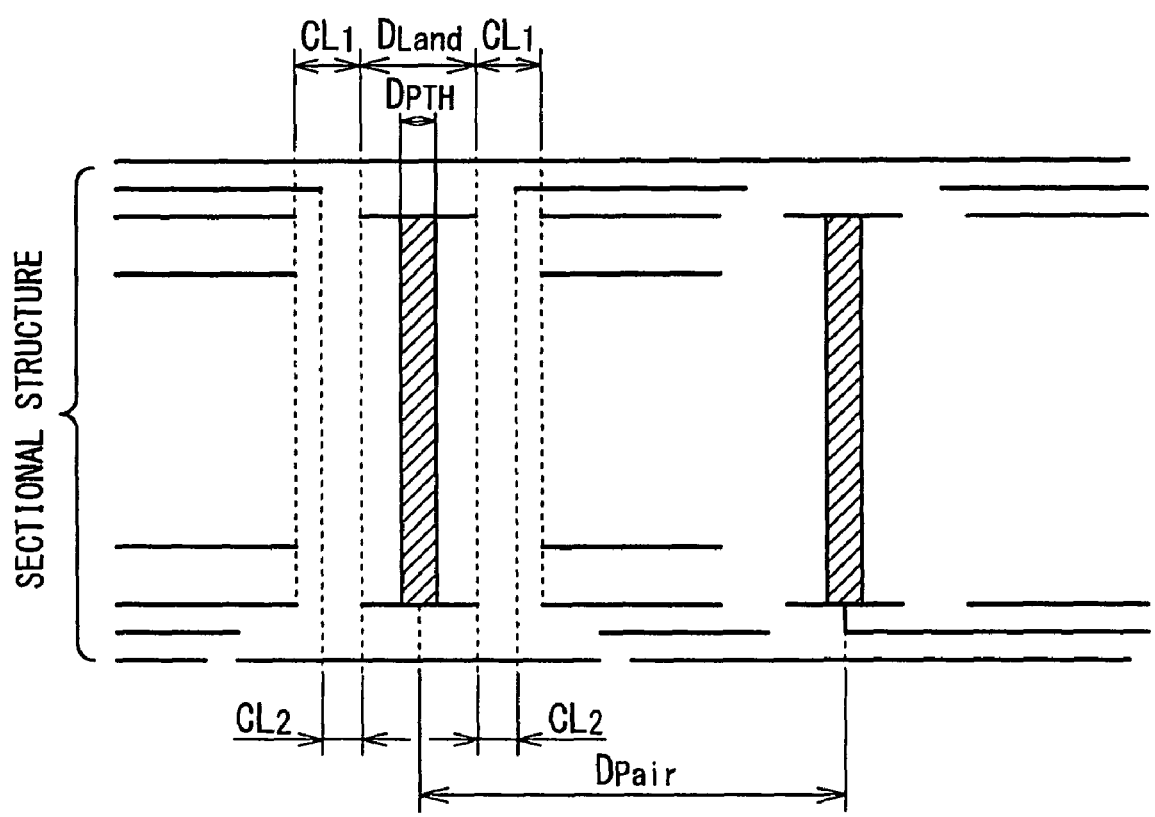
FIG. 3 is a section view describing various parameters of PTH in a semiconductor package substrate.

FIG. 3 is a cross sectional view for explaining various parameters of the PTH (Plated Through Hole) in a semiconductor package substrate. The semiconductor package substrate is multilayer-structured. The symbol $D_{PTH}$ indicates the diameter of PTH, $D_{Land}$ indicates the diameter of the land of the PTH, and $D_{Pair}$ indicates the distance between two PTHs, respectively. $C_{L1}$ indicates the distance between the land of the PTH and the conductor in the same layer, and $C_{L2}$ indicates the distance between the land of the PTH and the conductor in an adjacent layer, respectively.

Even in the same substrate technology, the S-parameter of the PTH varies as respective parameters, $D_{PTH}$, $D_{Land}$, $C_{L1}$, $C_{L2}$ and $D_{Pair}$. Therefore, the S-parameter is calculated for all possible variations of the values of respective parameters which are used in the later design. This calculation can be carried out by an electromagnetic simulation. However, if some of the S-parameters are already known, results thereof can be obtained from any existent databases.

Other than the PTH, lookup tables are generated for each of traces, pads, vias and other respective structural parts on signal line paths. Here, in this explanation, for simplicity, the bundle of all respective lookup tables is referred to as the lookup table of the semiconductor package substrate as well.

Here, the S-parameter is mainly employed for distributed circuit model. However, a different type of N-port network parameter, such as Y/Z/T-parameters may be used. Also, a lumped circuit model may be employed which includes the parameters such as the parasitic capacitance, the parasitic inductance and the like.

The step S3-2 will be described below in detail. At the step S3-2, a semiconductor package substrate design support apparatus generates an equivalent circuit of a semiconductor input/output element, as a pre-generation of the step S3-3, similarly to the step S3-1. The generated circuits may be stored in the memory 12 or may be directly transmitted to the parameter determination function section 103 from the equivalent circuit generation function section 102.

Figure 4:
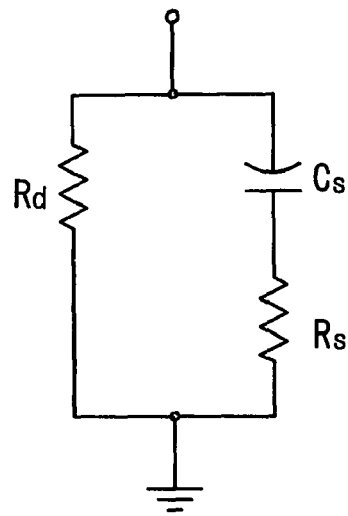
FIG. 4 is an example of an equivalent circuit diagram based on a lumped constant approximation for a semiconductor input/output element.

FIG. 4 shows an example of an equivalent circuit diagram of a semiconductor input/output element based on the lumped model. In this equivalent circuit, the semiconductor input/output element contains a DC (Direct Current) differential resistance $R_d$, a parasitic capacitance $C_s$ and a parasitic series resistance $R_s$ associated with the parasitic capacitance $C_s$. Here, two parallel paths are connected between an input/output unit and the ground. The $R_d$ exists on one of the parallel paths, and the $C_s$ and the $R_s$ that are connected in series exist on the other of the parallel paths.

At this time, the impedance $Z_d$ of the semiconductor input/output element can be represented by, $$Z_d = 1/((1/(j\omega C_s + R_s)) + (1/R_d)) \qquad \text{[Equation 1]}$$

Here, the respective values of $R_d$, $C_s$ and $R_s$ may be obtained from known specification values written on catalogs or the like or may be finely adjusted by an actual measurement.

The step S3-3 will be described below in detail. At the step S3-3, a semiconductor package substrate manufacturing apparatus determines the parameters of the respective structural parts of the semiconductor package substrate in accordance with the results obtained through the steps S3-1 and S3-2. The criteria are represented by the following equation.

$$I_m(Z_d+Z_{package}) \approx 0 \qquad \text{[Equation 2]}$$

Here, the $Z_d$ is the input/output impedance of the semiconductor input/output element being observed from the semiconductor package substrate. The $Z_{package}$ is the input/output impedance of the semiconductor package substrate being observed from the semiconductor input/output element.

Ideally, both of the $Z_d$ and the $Z_{package}$ are desired to be adjusted to the standard impedance value 50Ω. However, in reality, variations of the impedance along a signal transmission line are unavoidable. Therefore, in an embodiment of the present invention, without pursuing the standard impedance value 50Ω, the impedance matching at the connection between the semiconductor input/output element and the semiconductor package substrate is intended.

It is ideal that the impedance matching is achieved over all frequencies. At the minimum, at least one frequency where the impedance matching is achieved is required in frequency band being required for transmitting digital signals. Moreover, it is preferable that such frequencies exist at two or more points. It is further preferable that such frequencies distribute evenly in a desired frequency band and not are concentrated around a specific frequency.

The proximity of the left side value of the equation 2 to 0 is assumed to be determined based on the standard of, for example, OIF-CEI2.0 defined in OIF (Optical Internetworking Forum). This standard will be explained later.

Thus, at the step S3-3, the semiconductor package substrate design support apparatus determines a combination of parameters for respective structural parts of a signal transmission line at which the frequencies satisfying the equation 2 exist in at least one or more frequency points in the desirable frequency range.

The impedance $Z_{package}$ of a semiconductor apparatus package substrate varies depending on its structure.

Figure 5:
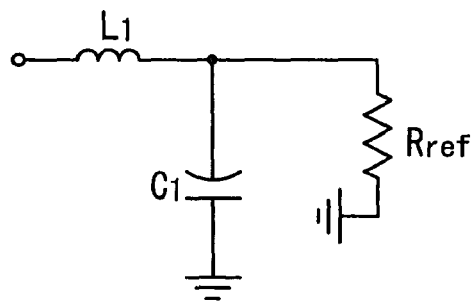
FIG. 5 is an equivalent circuit diagram in an example of a semiconductor package substrate having a one-layer interconnection structure.

FIG. 5 is an example equivalent circuit of the semiconductor package substrate having a one-layer interconnection structure. In this example, the input/output portion of the semiconductor package substrate is connected to an inductance $L_1$. The other end of the inductance $L_1$ is connected to a capacitor $C_1$ and a reference resistor $R_{ref}$. Here, the reference resistor $R_{ref}$ indicates the impedance of a secondary mounting substrate on which the semiconductor package substrate is secondarily mounted. The other ends of the capacitor $C_1$ and the reference resistor Rref are connected to the ground, respectively.

Figure 6:
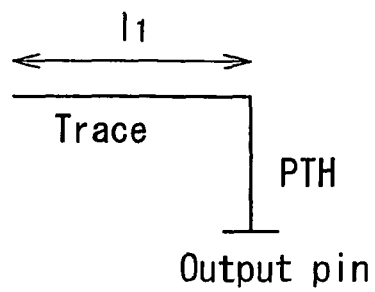
FIG. 6 is a view for explaining the correspondence between the respective structural parts of the semiconductor package substrate and the respective elements of the equivalent circuit in the example shown in FIG. 5.

FIG. 6 is a schematic drawing for explaining a correspondence between the respective structural parts of the semiconductor package substrate in the example of FIG. 5 and the respective elements of the equivalent circuit. The inductance $L_1$ in FIG. 5 corresponds to the interconnection (Trace) of the length $l_1$ in FIG. 6. The capacitor $C_1$ in FIG. 5 corresponds to the PTH (Plated Through Hole) in FIG. 6. The reference resistor Rref in FIG. 5 corresponds to the opposite side of the output portion in FIG. 6.

From the foregoing explanation, the impedance of the semiconductor package substrate can be represented by the equation 3.

$$Z_{package}=j\omega L_1+1/((1/R_{ref})+j\omega C_1) \qquad \text{[Equation 3]}$$

Here, $L_1$ and $C_1$ are as follows.
$L_1=l_1 L_0$
$C_1=l_1 C_0+C_{1v}$

Among these parameters, the $C_{1v}$ is obtained from the lookup table.

From the equation 3, the restriction condition based on the equation 2 is represented by the equation 4.

$$I_m(1/(1/((1/j\omega C_s)+R_s)+1/R_d)+j\omega L_1+1/((1/R_{ref})+j\omega C_1)) \approx 0 \qquad \text{[Equation 4]}$$

Next, structural parameters are selected such that a frequency satisfying the restriction condition of the equation 4 exists inside a desired frequency band which is determined by, for example, an input operation by an operator. The semiconductor package design supporting apparatus carries out this operation to find the optimum parameter sets which satisfy the condition given by the equation 4 or 2 as close as possible.

After that, a signal transmission line layout pattern is cut out, and a three-dimensional electromagnetic field analysis is carried out to precisely determine the $Z_{package}$. When the restriction condition of the equation 2 is not satisfied with the obtained $Z_{package}$, a fine adjustment of the structure parameter is carried out, and the three-dimensional electromagnetic field analysis is repeatedly executed to check the restriction condition of the equation 2.

Figure 7:
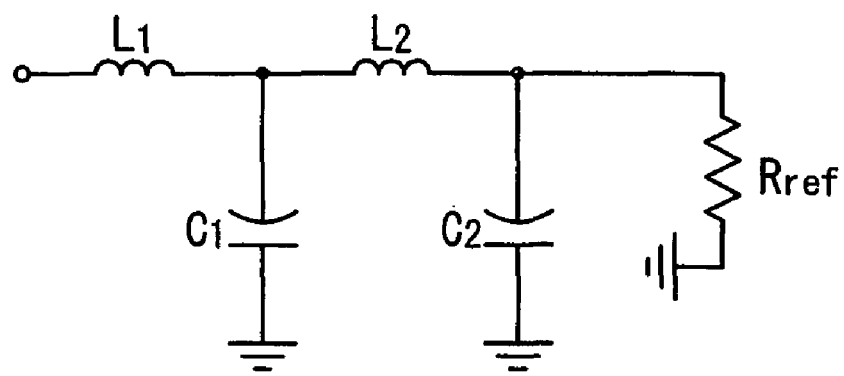
FIG. 7 is an equivalent circuit diagram of an example of a semiconductor package substrate having a two-layer interconnection structure.

FIG. 7 is an equivalent circuit diagram in an example of a semiconductor package substrate having a two-layer interconnection structure. In this example, an input/output portion of the semiconductor package substrate is connected to the inductance $L_1$. The other end of the inductance $L_1$ is connected to the capacitor $C_1$ and the inductance $L_2$. The other end of the capacitor $C_1$ is connected to the ground. The other end of the inductance $L_2$ is connected to the capacitor $C_2$ and the reference resistor Rref. Here, the reference resistor Rref is the impedance of the secondary mounting substrate on which the semiconductor package substrate is secondarily mounted. The respective other ends of the capacitor $C_2$ and the reference resistor Rref are connected to the ground.

Figure 8:
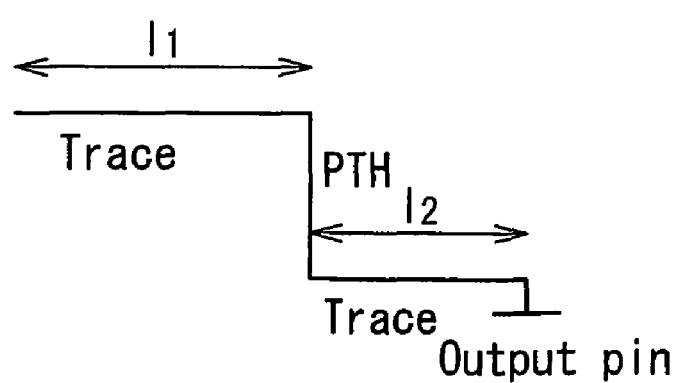
FIG. 8 is a view describing the correspondence between the respective structural parts of the semiconductor package substrate and the respective elements of the equivalent circuit in the example shown in FIG. 7.

FIG. 8 is a view for explaining a correspondence between the respective structural parts of the semiconductor package substrate in the example of FIG. 7 and the respective elements of the equivalent circuit. The inductance $L_1$ in FIG. 7 corresponds to the interconnection of the first layer of the length $l_1$ in FIG. 8. The total of the capacitors $C_1$, $C_2$ in FIG. 7 corresponds to the PTH in FIG. 8. The reference resistor Rref in FIG. 7 corresponds to the opposite side of the output portion in FIG. 8.

From the above explanation, the impedance of the semiconductor package substrate can be represented by the equation (5).

$$Z_{package}=j\omega L_1+(1/((1/(j\omega L_2+(1/((1/R_{ref})+j\omega C_2)))+j\omega C_1)) \qquad \text{[Equation 5]}$$

Here, $L_1$, $C_1$, $L_2$ and $C_2$ are as follows.
$L_1=l_1 L_0$
$C_1=l_1 C_0+C_{1v}$
$L_2=l_2 L_0$
$C_2=l_2 C_0+C_{2v}$ Among these parameters, the $C_{1v}$ and the $C_{2v}$ are assumed to be obtained from the lookup table that will be described later.

From the equation 5, the restriction condition based on the equation 2 is represented by the equation 6.

$$I_m((1/(1/((1/j\omega C_s)+R_s)+1/R_d))+j\omega L_1+(1/(1/(j\omega L_2+1/((1/R_{ref})+j\omega C_2))+j\omega C_1)))\approx 0 \quad \text{[Equation 6]}$$

Next, structural parameters are selected such that a frequency satisfying the restriction condition of the equation 6 exists inside a desired frequency band. The semiconductor package design supporting apparatus carries out this operation by finding out the parameter value closest to an ideal value from the lookup table for each of the structural parts. In the case of the two-signal layer structure, there are always two frequencies that satisfy the restriction condition. Thus, typically, in the two-signal layer structure, the impedance matching can be achieved in wider band as compared with the case of the one-layer structure.

After that, a signal transmission line layout pattern is cut out, and a three-dimensional electromagnetic field analysis is carried out to precisely determine the $Z_{package}$. When the restriction condition of the equation 2 is not satisfied from the obtained $Z_{package}$, a fine adjustment of the structure parameter is carried out, and the three-dimensional electromagnetic field analysis is repeatedly executed to check the restriction condition of the equation 2.

Although a designing method based on the lumped circuit model is used in both of the two examples, a designing method based on the distributed circuit can be adopted. In the case of the distributed circuit design, the lookup table of the N-port parameter is used. All of the structural parts on the signal transmission line are represented by using the parameterized N-port parameter, mainly, the S-parameter. The structural parameter is adjusted such that the frequency point satisfying the restriction condition of the equation 2 exists inside the desired frequency band by changing the structural parameter.

Also in this case, as the initial value of the structure parameter, the value determined from, for example, the equation 4 or 6 can be used in accordance with the foregoing lumped circuit simulation design.

Figure 9:
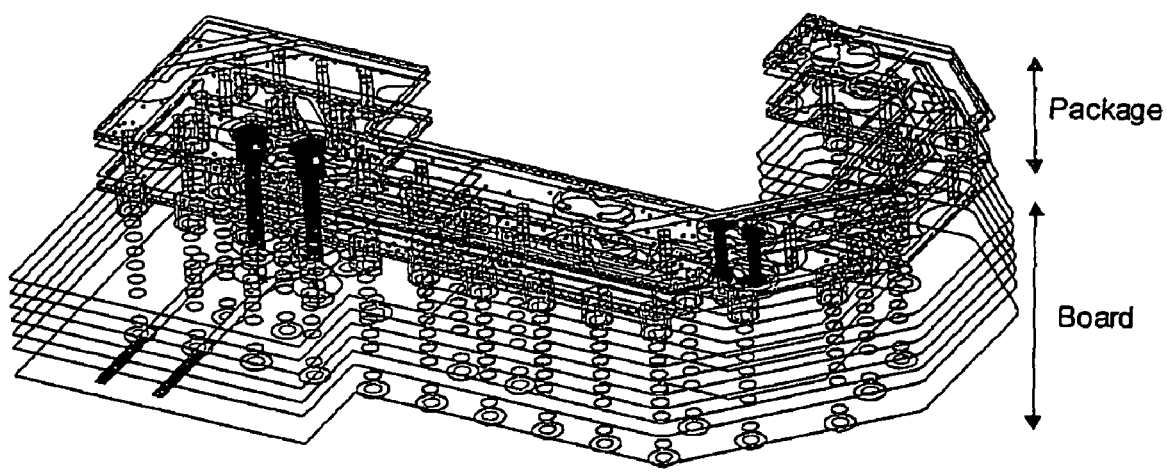
FIG. 9 is a diagrammatic view of a semiconductor package substrate that is secondarily mounted on a secondary mounting substrate.

FIG. 9 is a diagrammatic view of a semiconductor package substrate that is secondarily mounted on a secondary mounting substrate. In the plurality of layers, the range of "Package" corresponds to the semiconductor package substrate, and the range of "Board" corresponds to the secondary mounting substrate, respectively. However, in this diagrammatic view, the explanation about the relation between the multilayer structure and the PTH is intended, and the interconnection of the circuit and the like are not drawn. FIG. 3 is also a section view regarding the relation between the multilayer structure and the PTH of the semiconductor package substrate in FIG. 9.

FIG. 10 is a block diagram of a semiconductor package substrate on which a semiconductor input/output element is primarily mounted and which is secondarily mounted on a secondary mounting substrate. When the distributed circuit simulation is used, the values are set for the respective parameters of the structural part and the impedance and the like can be calculated by a full-wave three-dimensional electromagnetic field simulator. This block diagram also indicates a model for the full-wave three-dimensional electromagnetic field simulator.

In this block diagram, a semiconductor input/output element 21 is represented as TX/RX (Transmitter/Receiver). The semiconductor input/output element 21 is connected to a first signal line 22 in the semiconductor package substrate by primary mounting. The first signal line 22 is connected through a PTH 23 to a second signal line 22. That is, the first signal line 22 and the second signal line 22 are the interconnections of the layers different from each other. The second signal line 22 is connected through a BGA (Ball Grid Array) pad 24 to a secondary mounting substrate 25 by secondary mounting.

Here, each of the first and second signal lines 22 is represented as inductance serving as the differential interconnection model.

The PTH 23 is represented as an inductance which connects the two signal lines 22 to each other. Each end of the inductance is connected to a capacitor. The other end of each capacitor is connected to the ground.

The second signal line 22 and the secondary mounting substrate 25 are connected to each other through the BGA pad 24. The BGA pad 24 is also connected to a capacitor. The other end of the capacitor is connected to the ground.

By combining those model parts to each other, the circuit simulator can carry out a simulation of the semiconductor package substrate.

When the above operation is finished, similarly to the case of the lumped constant simulation, the signal transmission line layout pattern is cut out, and the three-dimensional electromagnetic field analysis is executed. In this way, the $Z_{package}$ is precisely obtained, thereby checking whether or not the restriction condition of the equation 2 is satisfied. If it is not satisfied, a fine adjustment of the structure parameter is carried out, and the three-dimensional electromagnetic field analysis is repeatedly executed to check the restriction condition of the equation 2. Typically, the distributed constant design gives a value close to the final verification result, as compared with the lumped constant simulation.

The operation principle of the distributed constant design can be described as follows. Only the representation is different, but it means a same physical phenomenon.

FIGS. 11 to 15 are circuit diagrams for explaining the impedance matching method of distributed circuits. In any of the cases, a semiconductor input/output element 31 is connected through a distributed signal line 34 to a termination resistor $R_{out}$ 37. The other end of the output side resistor $R_{out}$ 37 is connected to the ground 38. Also, the semiconductor input/output element has a parasitic capacitance 32 in its input/output portion. The other end of the parasitic capacitance 32 is connected to the ground 33.

FIG. 11A is a circuit diagram in a case that a capacitor 35 is added at the position of 1/4 wavelength from the semiconductor input/output element 31 in the distributed signal line 34. In this case, the phase of the electromagnetic wave is inverted by 180 degrees at the output end of the semiconductor element. FIG. 11B indicates an equivalent circuit of the circuit shown in FIG. 11A. In FIG. 11B, instead of the capacitor 35 in FIG. 11A, an inductor 39 is placed between the output end of the semiconductor element and the distributed signal line 34. The parasitic capacitance 32 is cancelled by the inductor 39.

FIG. 12A indicates a circuit diagram in a case that a capacitor 35 is added at the position of 1/8 wavelength from the semiconductor input/output element 31 in the distributed constant line 34. FIG. 12B indicates an equivalent circuit of the circuit shown in FIG. 12A. In FIG. 12B, the capacitor 35 in FIG. 12A is not placed, and the resistance value of the termination resistor $R_{out}$ 37 in FIG. 12B is smaller than 50Ω in the case of FIG. 12A.

FIG. 13A indicates a circuit diagram in a case that a capacitor 35 is added at the position of 3/8 wavelength from the semiconductor input/output element 31 in the distributed signal line 34. FIG. 13B indicates an equivalent circuit of the circuit shown in FIG. 13A. In FIG. 13B, the capacitor 35 in FIG. 13A is not placed, and the resistance value of the termination resistor Rout37 in FIG. 13B is larger than 50Ω in the case of FIG. 13A.

Figure 14A:
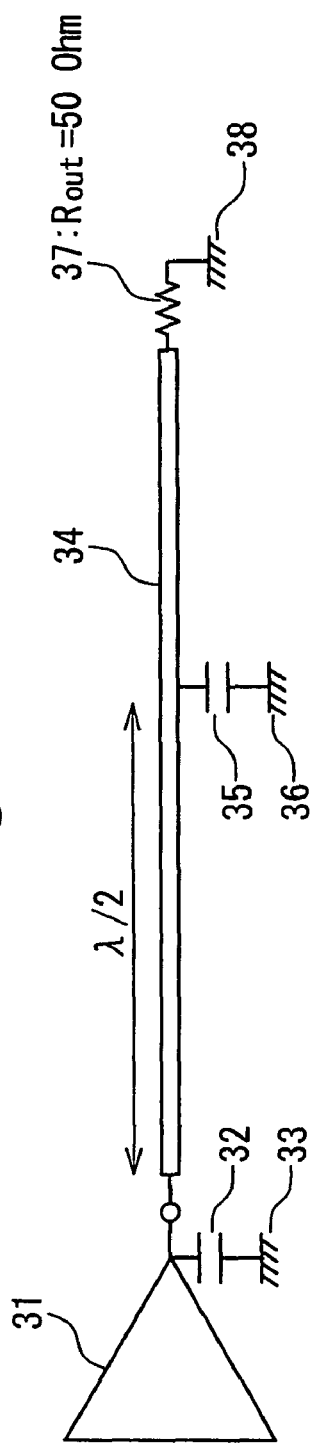
FIG. 14A is a circuit diagram in which a capacitor is added at a position of a 1/2 wavelength from a semiconductor input/output element on a distributed signal line.
Figure 14B:
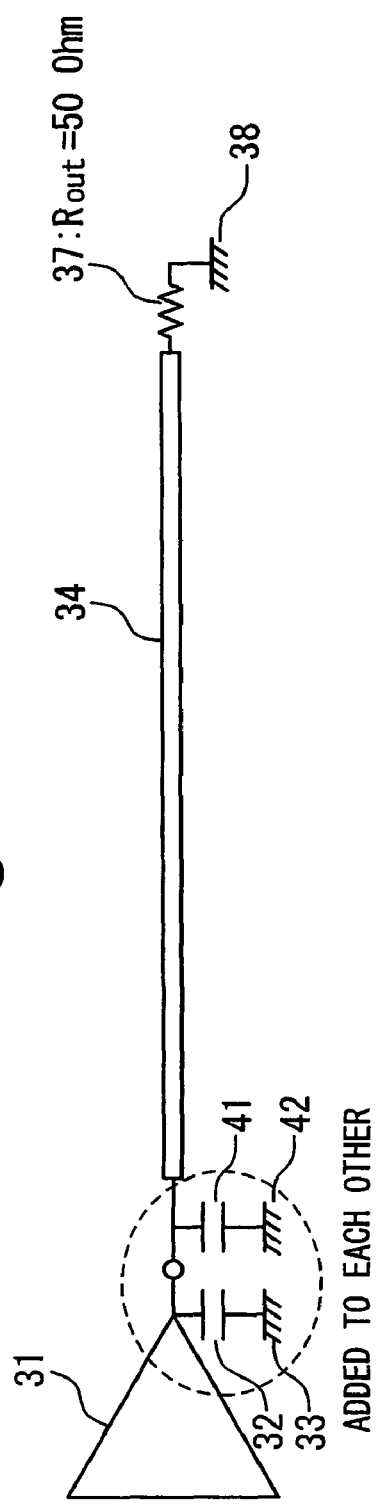
FIG. 14B is an equivalent circuit of the circuit shown in FIG. 14A.

FIG. 14A indicates a circuit diagram in a case that a capacitor 35 is added at the position of 1/2 wavelength from the semiconductor input/output element 31 in the distributed constant line 34. FIG. 14B indicates an equivalent circuit of FIG. 14A. In FIG. 14B, instead of the capacitor 35 in FIG. 14A, a capacitor 41 is placed between the output end of the semiconductor element and the distributed constant line 34. The capacitor 41 and the parasitic capacitance 32 are added to each other.

FIG. 15A indicates a circuit diagram in a case that a capacitor 35 is added at the position of 1/4 wavelength from the semiconductor input/output element 31 in the distributed signal line 34 and that a capacitor 43 is similarly added at the position of 1/2 wavelength, respectively. FIG. 15B indicates an equivalent circuit of the circuit shown in FIG. 15A. In FIG. 15B, instead of the capacitors 35, 42 in FIG. 15A, the capacitor 41 and the inductor 39 are placed between the output end of the semiconductor element and the distributed constant line 34. The capacitor 41, the parasitic capacitance 32 and the inductor 39 are cancelled to each other.

In this way, since the parameters of the distributed signal line 34 are adjusted, it is possible to cancel the parasitic capacitances of the semiconductor input/output elements and adjust the resistance value of the termination resistor. In this embodiment of the present invention, it is the principle of the semiconductor package substrate design method that this impedance matching process is performed until a desired frequency band is covered.

Here, FIG. 15A has the same circuit as the case of the two-signal layer structure in the foregoing lumped circuit designing method.

Actually, since an element functions as a pure capacitance or a pure resistance does not exist, the adaption design is required by executing the above explained modeling.

FIGS. 16 to 19 are the graphs showing the results of the adaption design. In any of the graphs, the horizontal axis indicates the frequency, and the vertical axis indicates the return loss. Each of the graphs represents the return loss of the total of the semiconductor input/output element and the semiconductor package substrate being observed from the secondary mounting substrate side in the situation in which the semiconductor input/output element, the semiconductor package substrate and the secondary mounting substrate are connected to each other. Among the three lines in each of FIGS. 16 to 19, the drawings, the wide line corresponds to the case in which a matching circuit is built in the semiconductor package substrate, and the other lines correspond to the case in which the semiconductor package substrate is adjusted to the standard resistance of 50Ω, respectively.

Moreover, as an example of the reference, the line corresponding to the standard based on the aforementioned OIF is also drawn. The OIF issues the document OIF-CEI-02.0 with regard to the SerDes rule. According to this document, the followings are ruled.

At the differential mode, the following is determined.

$$\text{Reflection Coefficient} < -8 \text{ dB}(100 \text{ MHz}-0.75 \text{ fb}) \quad \text{[Equation 7]}$$

At the common mode, the following is determined.

$$\text{Reflection Coefficient} < -6 \text{ dB}(100 \text{ MHz}-0.75 \text{ fb}) \quad \text{[Equation 8]}$$

Here, "fb" indicates the bit rate frequency. And the reflection coefficient is as follows.

$$\text{Reflection Coefficient} = |(Z_d - Z_{package})/(Z_d + Z_{package})| \quad \text{[Equation 9]}$$

Figure 16:
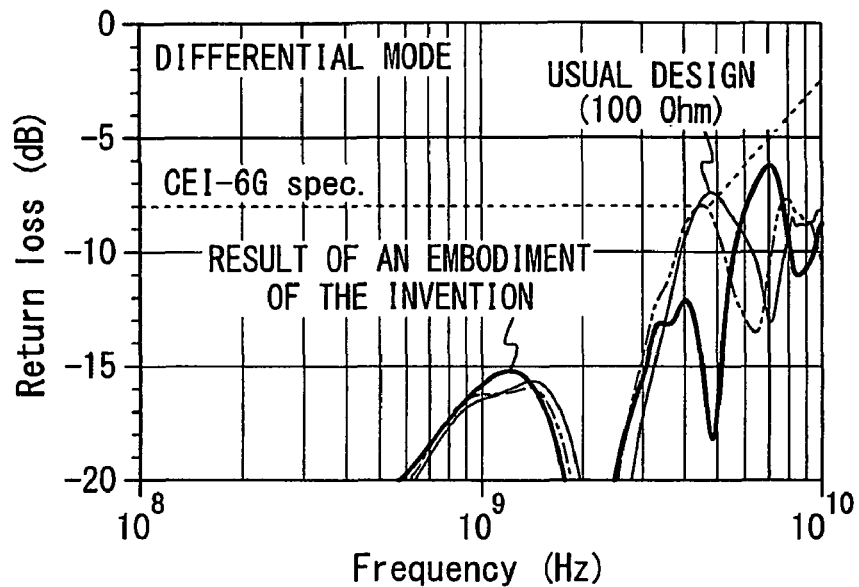
FIG. 16 is a graph showing a differential mode simulation result when a semiconductor input/output element is a receiver which describes a result of the adaption design according to an embodiment of the present invention.

FIG. 16 is the graph showing a simulation result when, at the differential mode, the semiconductor input/output element receives a signal.

Figure 17:
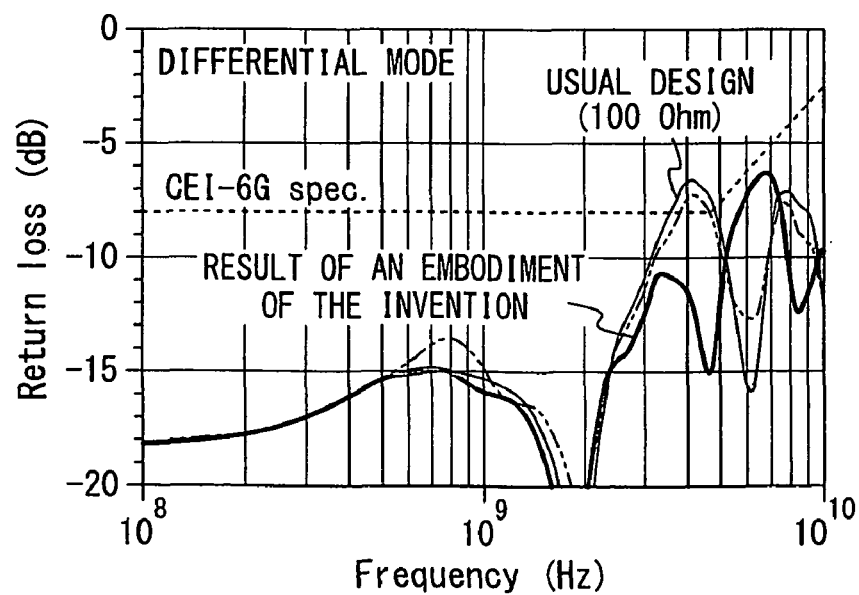
FIG. 17 is a graph showing a differential mode simulation result when a semiconductor input/output element is a transmitter which describes a result of the adaption design according to an embodiment of the present invention.

FIG. 17 is the graph showing a simulation result when, at the differential mode, the semiconductor input/output element transmits a signal.

Figure 18:
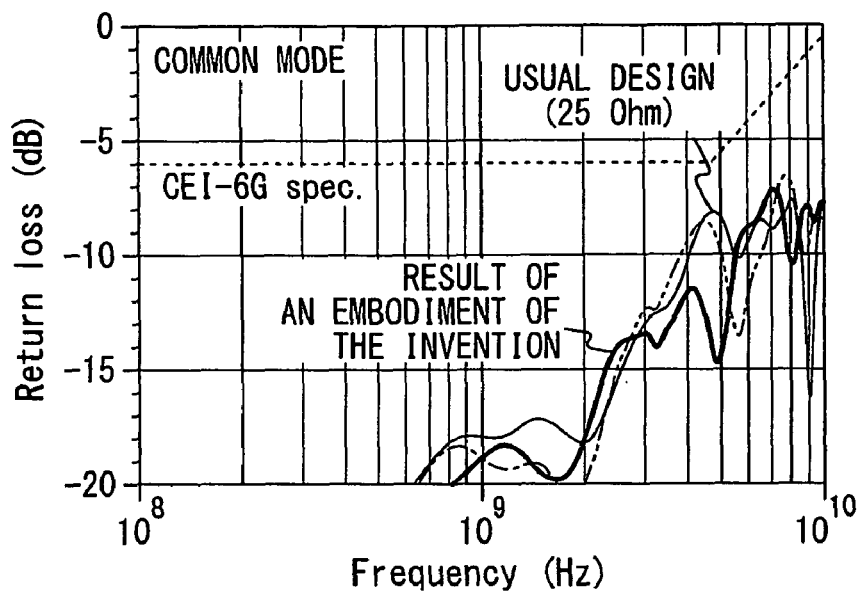
FIG. 18 is a graph showing a common mode simulation result when a semiconductor input/output element is a receiver which describes a result of the adaption design according to an embodiment of the present invention.

FIG. 18 is the graph showing a simulation result when, at the common mode, the semiconductor input/output element receives a signal.

Figure 19:
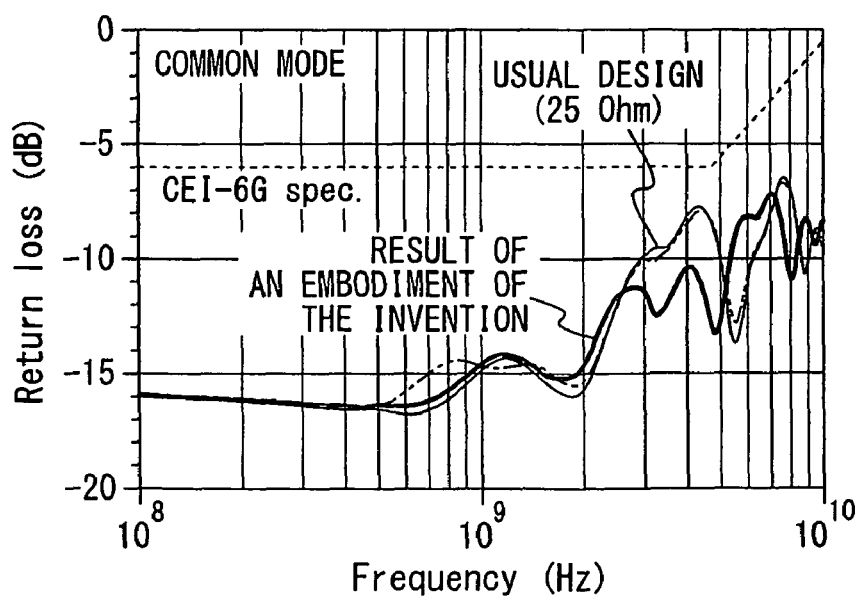
FIG. 19 is a graph showing a common mode simulation result when a semiconductor input/output element is a transmitter which describes a result of the adaption design according to an embodiment of the present invention.

FIG. 19 is the graph showing a simulation result when, at the common mode, the semiconductor input/output element transmits a signal.

In this way, all of the graphs have a frequency or a frequency band that satisfies the standard of the OIF. This indicates the effectiveness of the semiconductor package substrate designing method according to an embodiment of the present invention.

In a semiconductor package substrate designing method according to an embodiment of the present invention, a function for the impedance matching between the semiconductor input/output element and the secondary mounting substrate is built in a semiconductor package substrate. As a result, it is possible to reduce the multiple reflection of high speed digital signals and obtain desirable signal waveform and stable operation.

At this time, the impedance matching function is attained by adjusting only the parasitic inductance and the parasitic capacitance, which are unavoidable in a signal transmission line. Thus, there is no adverse effect on a high speed signal transmission that is caused by an addition of an extra structural part or electronic part. Also, since the extra layout space is not required, the signal density is not dropped. Moreover, since the distributed constant structural parts of the signal transmission line is used, wide band impedance matching being required to transmit the digital signal is obtained. Also, since the design can be attained by using a general package substrate, the cost can be suppressed. According to a semiconductor package substrate designing method of an embodiment of the present invention, such excellent effects can be achieved.

It is apparent that the present invention is not limited to the above embodiments, but may be modified and changed without departing from the scope and spirit of the invention.

What is claimed is:

1. A design method of a semiconductor package substrate, said method comprising:
    designing a first circuit of the semiconductor package substrate, the first circuit comprising a transmission line through which a semiconductor element is primarily mounted;
    analyzing, as executed by a processor in a computer, a first reflected wave generated in the first circuit;
    designing a second circuit configured to generate a second reflected wave for cancelling the first reflected wave; and
    designing a third circuit comprising an impedance that is closer to an impedance of the semiconductor element than an impedance of the first circuit by combining the first circuit and the second circuit.

2. The design method of the semiconductor package substrate according to claim 1, wherein the designing the second circuit comprises:
    generating a lookup table storing a parameter of a structural part in the semiconductor package substrate;
    generating an equivalent circuit of the semiconductor element observed from the semiconductor package substrate which primarily mounts the semiconductor element; and determining the parameter of the structural part based on the lookup table and the equivalent circuit, and
wherein the determining the parameter of the structural element comprises:
selecting the parameter of the structural part from the lookup table to satisfy the following conditions:
that a summation of an imaginary part of an input and an output impedance of the semiconductor element and an imaginary part of an input and an output impedance of the semiconductor package substrate is smaller than a predetermined threshold value in a determined frequency range at a connection portion of the semiconductor element and the semiconductor package substrate; and
that an impedance of the semiconductor package substrate observed from a secondary mounting substrate on which the semiconductor package substrate is secondarily mounted is matched with a standard impedance.

3. The design method of the semiconductor package substrate according to claim 2, wherein the determined frequency range includes at least one frequency point being used in an operation of the semiconductor element.

4. The design method of the semiconductor package substrate according to claim 2, wherein the selecting is performed when a condition represented below is satisfied:
where a reflection coefficient<−8 dB in a differential mode when a frequency is in a range between 100 MHz and 0.75 fb, wherein fb is a bit rate frequency, and
where a reflection coefficient<−6 dB in a common mode when a frequency is in a range between 100 MHz and 0.75 fb.

5. The design method of the semiconductor package substrate according to claim 2, wherein each of the lookup table, the equivalent circuit and the parameter comprises a value of a lumped constant approximation.

6. The design method of the semiconductor package substrate according to claim 5, wherein the designing the second circuit comprises:
arranging a capacitor in a location between $\lambda/8$ and $\lambda/4$ from a parasitic capacitance of an equivalent circuit of the transmission line wherein the $\lambda$ represents a wavelength when performing a cancelling of a parasitic capacitance, and
arranging a capacitor in a location between $3\lambda/8$ and $\lambda/2$ from the parasitic capacitance of an equivalent circuit of the transmission line when performing a cancelling of a parasitic inductance.

7. The design method of the semiconductor package substrate according to claim 2, wherein each of the lookup table, the equivalent circuit, and the parameter comprises a value of a distributed constant approximation.

8. The design method of the semiconductor package substrate according to claim 2, wherein the designing the second circuit comprises performing the generating the lookup table, generating the equivalent circuit, and the determining the parameter based on a lumped constant approximation by adopting a result of the performing as an initial value, and performing the generating lookup table, the generating the equivalent circuit, and the determining the parameter based on a distributed constant approximation.

9. A manufacturing method of a semiconductor package substrate, said method comprising:
designing a semiconductor package substrate by the method according to claim 1; and
manufacturing the semiconductor package substrate including the third circuit.

10. A semiconductor package substrate design support apparatus, comprising:
a first circuit design section configured to design a first circuit of a semiconductor package substrate, the first circuit comprising a transmission line through which a semiconductor element is primarily mounted;
a reflected wave analysis section configured to analyze a first reflected wave generated in the first circuit;
a second circuit design section configured to design a second circuit configured to generate a second reflected wave for cancelling the first reflected wave; and
a third circuit design section configured to design a third circuit having an impedance that is closer to an impedance of the semiconductor element than an impedance of the first circuit by combining the first circuit and the second circuit.

11. The semiconductor package substrate design support apparatus according to claim 10, wherein the second circuit design section comprises:
a lookup table generation section configured to generate a lookup table storing a parameter of a structural part in the semiconductor package substrate;
an equivalent circuit generation function section configured to generate an equivalent circuit of the semiconductor element observed from the semiconductor package substrate which primarily mounts the semiconductor element; and
a parameter determination function section configured to determine the parameter of the structural element based on the lookup table and the equivalent circuit,
wherein the parameter determination function section is configured to select the parameter of the structural part from the lookup table to satisfy the following conditions:
that a summation of an imaginary part of an input and output impedance of the semiconductor element and an imaginary part of an input and output impedance of the semiconductor package substrate is smaller than a predetermined threshold value in a determined frequency range at a connection portion of the semiconductor element and the semiconductor package substrate, and
that an impedance of the semiconductor package substrate observed from a secondary mounting substrate on which the semiconductor package substrate is secondarily mounted is matched with a standard impedance.

12. The semiconductor package substrate design support apparatus according to claim 11, wherein the determined frequency range includes at least one frequency point being used in an operation of the semiconductor element.

13. The semiconductor package substrate design support apparatus according to claim 11, wherein the parameter determination function section is configured to perform the selecting the parameter when a condition represented below is satisfied:
where a reflection coefficient<−8 dB in a differential mode when a frequency is in a range between 100 MHz and 0.75 fb, wherein the fb is a bit rate frequency, and
where a reflection coefficient<−6 dB in a common mode when a frequency is in a range between 100 MHz and 0.75 fb.

14. The semiconductor package substrate design support apparatus according to claim 11, wherein each of the lookup table, the equivalent circuit, and the parameter comprises a value of a lumped constant approximation.

15. The semiconductor package substrate design support apparatus according to claim 11, wherein each of the lookup table, the equivalent circuit, and the parameter comprises a value of a distributed constant approximation.

16. The semiconductor package substrate design support apparatus according to claim 11, wherein the parameter determination function section is configured to determine the parameter of the structural part by performing a method comprising:

performing the generating the lookup table, generating the equivalent circuit, and the determining the parameter based on a lumped constant approximation by adopting a result of the performing as an initial value, and performing the generating lookup table, the generating the equivalent circuit, and the determining the parameter based on a distributed constant approximation.

* * * * *